United States Patent
Ikeda et al.

(10) Patent No.: US 11,501,106 B2
(45) Date of Patent: Nov. 15, 2022

(54) ANOMALY FACTOR ESTIMATION DEVICE, ANOMALY FACTOR ESTIMATION METHOD, AND STORAGE MEDIUM

(71) Applicant: NIPPON TELEGRAPH AND TELEPHONE CORPORATION, Chiyoda-ku (JP)

(72) Inventors: Yasuhiro Ikeda, Musashino (JP); Yusuke Nakano, Musashino (JP); Keishiro Watanabe, Musashino (JP); Keisuke Ishibashi, Musashino (JP); Ryoichi Kawahara, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 654 days.

(21) Appl. No.: 16/482,605

(22) PCT Filed: Nov. 7, 2017

(86) PCT No.: PCT/JP2017/040090
§ 371 (c)(1),
(2) Date: Jul. 31, 2019

(87) PCT Pub. No.: WO2018/142703
PCT Pub. Date: Aug. 9, 2018

(65) Prior Publication Data
US 2020/0250475 A1    Aug. 6, 2020

(30) Foreign Application Priority Data
Feb. 2, 2017    (JP) .............................. JP2017-017922

(51) Int. Cl.
*G06K 9/62*     (2022.01)
*G06N 20/00*    (2019.01)
*G06F 9/30*     (2018.01)

(52) U.S. Cl.
CPC ....... *G06K 9/6256* (2013.01); *G06F 9/30036* (2013.01); *G06N 20/00* (2019.01)

(58) Field of Classification Search
None
See application file for complete search history.

(56) References Cited

U.S. PATENT DOCUMENTS

2017/0061307 A1*  3/2017  Bates .................... H04L 41/064

FOREIGN PATENT DOCUMENTS

JP    2007-329329 A    12/2007

OTHER PUBLICATIONS

Chandola V, Banerjee A, Kumar V. Anomaly detection: A survey. ACM computing surveys (CSUR). Jul. 30, 2009; 41(3):1-58. (Year: 2009).*

(Continued)

*Primary Examiner* — Vincent Gonzales
(74) *Attorney, Agent, or Firm* — Oblon, McClelland, Maier & Neustadt, L.L.P.

(57) ABSTRACT

A device for estimating a cause of an anomaly comprises: a detection unit to detect an anomaly in a detection target based on a learner trained on first numerical vectors obtained from a detection target when the detection target is under a normal condition and second numerical vectors to be obtained from the detection target at multiple time; and a first computing unit to compute, for each metric of a second numerical vector from which an anomaly has been detected, as information for estimating a metric of cause of the anomaly, a value obtained by subtracting, from a value of the metric, an average of the metric in the first numerical vectors, and dividing a result of the subtracting by standard deviation of the metric in the first numerical vectors. This device supports estimation of the cause of an anomaly detected in a target object for detecting an anomaly.

3 Claims, 10 Drawing Sheets

(56) References Cited

OTHER PUBLICATIONS

Rayana S, Akoglu L. Less is more: Building selective anomaly ensembles. Acm transactions on knowledge discovery from data (tkdd). May 24, 2016; 10(4):1-33. (Year: 2016).*

Agrawal S, Agrawal J. Survey on anomaly detection using data mining techniques. Procedia Computer Science. Jan. 1, 2015;60:708-13. (Year: 2015).*

International Search Report dated Dec. 19, 2017 in PCT/JP2017/040090 filed Nov. 7, 2017.

Sakurada, M. et al., "Dimensionality Reduction with the Autoencoder for Anomaly Detection for Spacecrafts," The 28$^{th}$ Annual conference of the Japanese Society for Artificial Intelligence, 2014, [online], May 12, 2014 [retrieved on Nov. 30, 2017], Internet <URL: https://kaigi.org/jsai/webprogram/2014/pdf/94.pdf>, 5 pages.

Saeki, Y. et al., "Log Analysis for Finding Trouble Sources in Distributed Systems," IEICE Technical Report CPSY2008-16(Aug. 2008), Jul. 28, 2008, vol. 108, No. 180, 8 pages.

Muteki, K. "Process Monitoring Development Utilizing Plant Data-Multivariate Analysis Applications (Consideration on operating support utilizing plant data)—(Concept of user-oriented operating support and utilization of on-site data)," Instrumentation and Control Engineering, Jan. 1, 2002, vol. 45, No. 1, 13 pages (with English translation).

Hodge, V. J., et al., "A Survey of Outlier Detection Methodologies," Artifical Intelligence Review 22, 2004, 42 pages.

* cited by examiner

ANOMALY FACTOR ESTIMATION DEVICE, ANOMALY FACTOR ESTIMATION METHOD, AND STORAGE MEDIUM

TECHNICAL FIELD

The present invention relates to an anomaly factor estimation device, an anomaly factor estimation method, and a computer program.

BACKGROUND ART

Let us consider anomaly detection where an anomaly is detected if data shows a tendency different from normal data in a system with a function to observe various data in real time.

Such an anomaly detection function trains training data of "normal condition", and detects anomalies if test data shows a tendency different from the training data during "testing operation".

If each metric of the observed data is compared to the normal condition, the increased number of observed metrics increases the probability that at least one metric shows an erroneous trend, resulting in the detection of an "anomaly" in many time ranges. For example, if all data is normally distributed, the probability that an observed value does not fall within ±3σ is about 0.6% (see Non-Patent Document 1). However, if the number of observed metrics is N, then the probability that all the observed metrics fit within the mean±3σ is $0.994^N$, which is reduced to about 54% with N=100.

RELATED-ART DOCUMENTS

Non Patent Document

Non Patent Document 1: Hodge, Victoria J., and Jim Austin. "A survey of outlier detection methodologies" Artificial intelligence review 22.2 (2004): 85-126.
Non Patent Document 2: M. Sakurada, K. Yairi, "Anomaly Detection of Spacecraft through Dimensional Reductions Using Auto-Encoders," Artificial Intelligence Society, National Congress Papers 28, 1-3, 2014

SUMMARY OF THE INVENTION

Problem to be Solved by the Invention

On the other hand, an algorithm has been proposed for outputting the "degree of anomaly" of test data when the correlation between metrics under normal condition is disrupted in the test data, not the degree of anomaly per metric (e.g., Non-Patent Document 1, Non-Patent Document 2). Although such an algorithm solves the problem of frequent "anomalies" described above, it is difficult to determine which observation metric is the cause of an anomalies since the output of the algorithm is one dimension of "anomalies."

The present invention has been made in light of the above-mentioned points, and is intended to assist in estimating the cause when an anomaly is detected with respect to a target for detecting an anomaly.

Means to Solve the Problem

To solve the above-noted problem, a device for estimating a cause of an anomaly comprises: a detection unit to detect an anomaly in a detection target based on a learner trained on first numerical vectors obtained from a detection target when the detection target is under a normal condition and second numerical vectors to be obtained from the detection target at multiple times; and a first computing unit to compute, for each metric of the second numerical vectors from which an anomaly has been detected, as information for estimating a metric of cause of the anomaly, a value obtained by subtracting, from a value of the metric, an average of the metric in the first numerical vectors, and dividing a result of the subtracting by standard deviation of the metric in the first numerical vectors.

Effect of the Invention

It is possible to assist in the estimation of the cause of an anomaly detected in a target object for detecting an anomaly.

MODES FOR CARRYING OUT THE INVENTION

Figure 1:
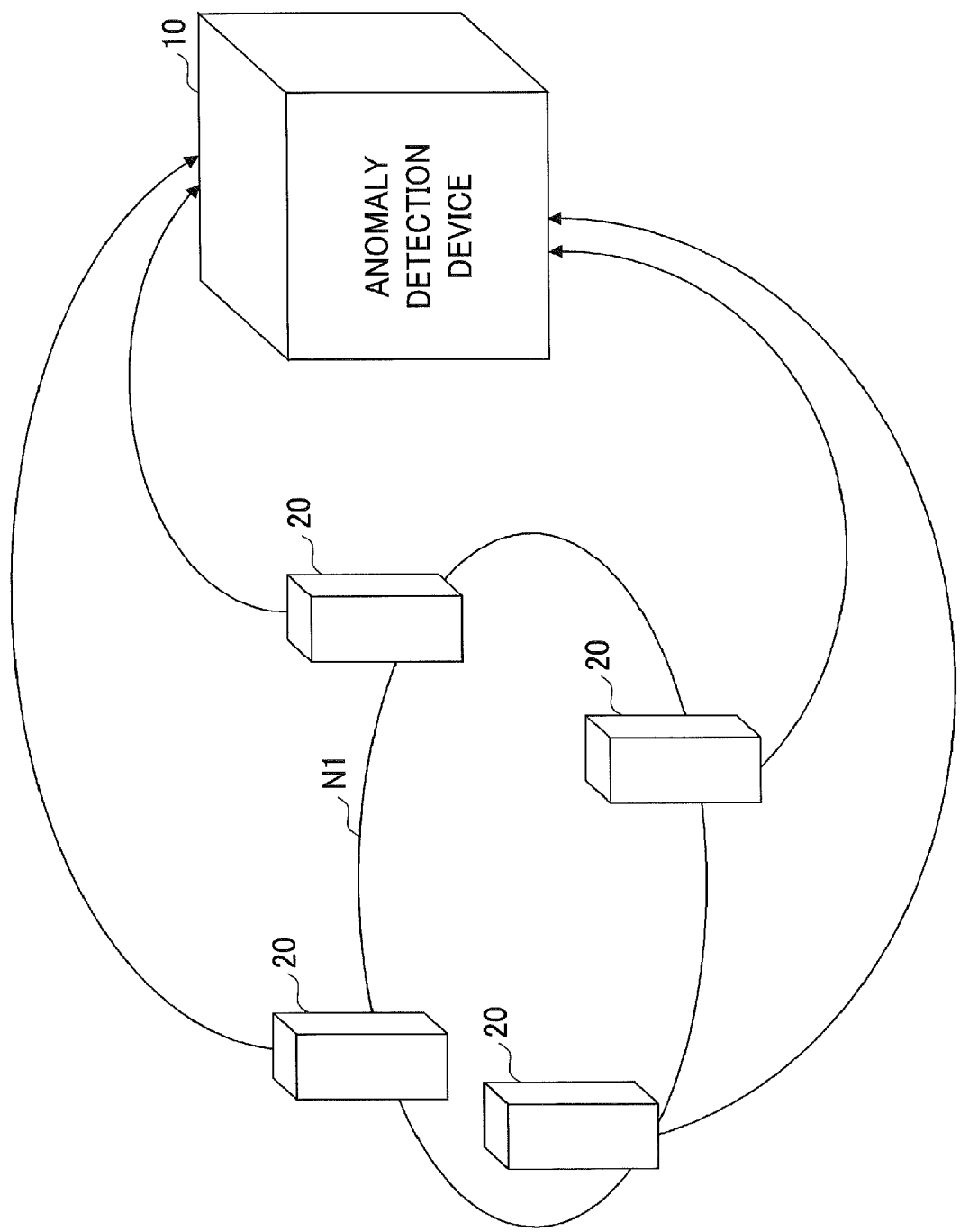
FIG. 1 is a schematic diagram showing an exemplary structure of a wireless communication system according to an embodiment.

In the following, embodiments of the present invention will be described with reference to the drawings. FIG. 1 is a schematic diagram showing an exemplary structure of a wireless communication system according to an embodiment. In FIG. 1, Network N1 is a target network for anomaly detection. Network N1 is composed of multiple nodes such as routers and servers connected to each other, and packets are transmitted and received from one node to another to provide a predetermined service.

A measuring device 20 is disposed at multiple locations in the network N1. The measuring device 20 monitors data at its location to collect observed data at multiple times. Examples of the observed data to be collected may include MIB (Management Information Base) data, flow data by NetFlow, CPU utilization rate.

MIB is a common policy shared by manufacturers for monitoring network devices. MIB data is aggregated, for example, every 5 minutes as a unit, and includes "time of day, host name, interface (IF) name, input data quantity (ibps), output data quantity (obps)", for example.

NetFlow is a technique for monitoring networks on a flow-by-flow basis, and when a communication is terminated, NetFlow outputs information about the flow of the communication. The flow is a unit for identifying "who" is communicating with "whom," "how" the communication is performed, and "how much" data is communicated, and the flow may include five attributes: the IP address of a sender (srcIP), the port number of the sender (srcport), the IP address of a receiver (dstIP), the port number of the receiver (dstport), and a communication protocol (protocol). Flow data includes "flow start time, srcIP, srcport, dstIP, dstport, proto, flow duration, total number of packets transmitted, total number of bytes transmitted," among others.

The CPU usage rate is, for example, the usage rate of a CPU included in a server or a router included in the network N1.

Observation data collected by the measuring device 20 is collected by the anomaly detection device 10. The anomaly detection device 10 is a computer that trains the characteristics of normal condition from the collected observed data and detects the occurrence of an anomaly (determining the presence or absence of an anomaly) from the subsequently inputted observed data based on the training result. The process in which the characteristics of the normal condition are trained may be called "training process." The process in which anomalies are detected based on the training results in the training process may be called "test processing."

Figure 2:
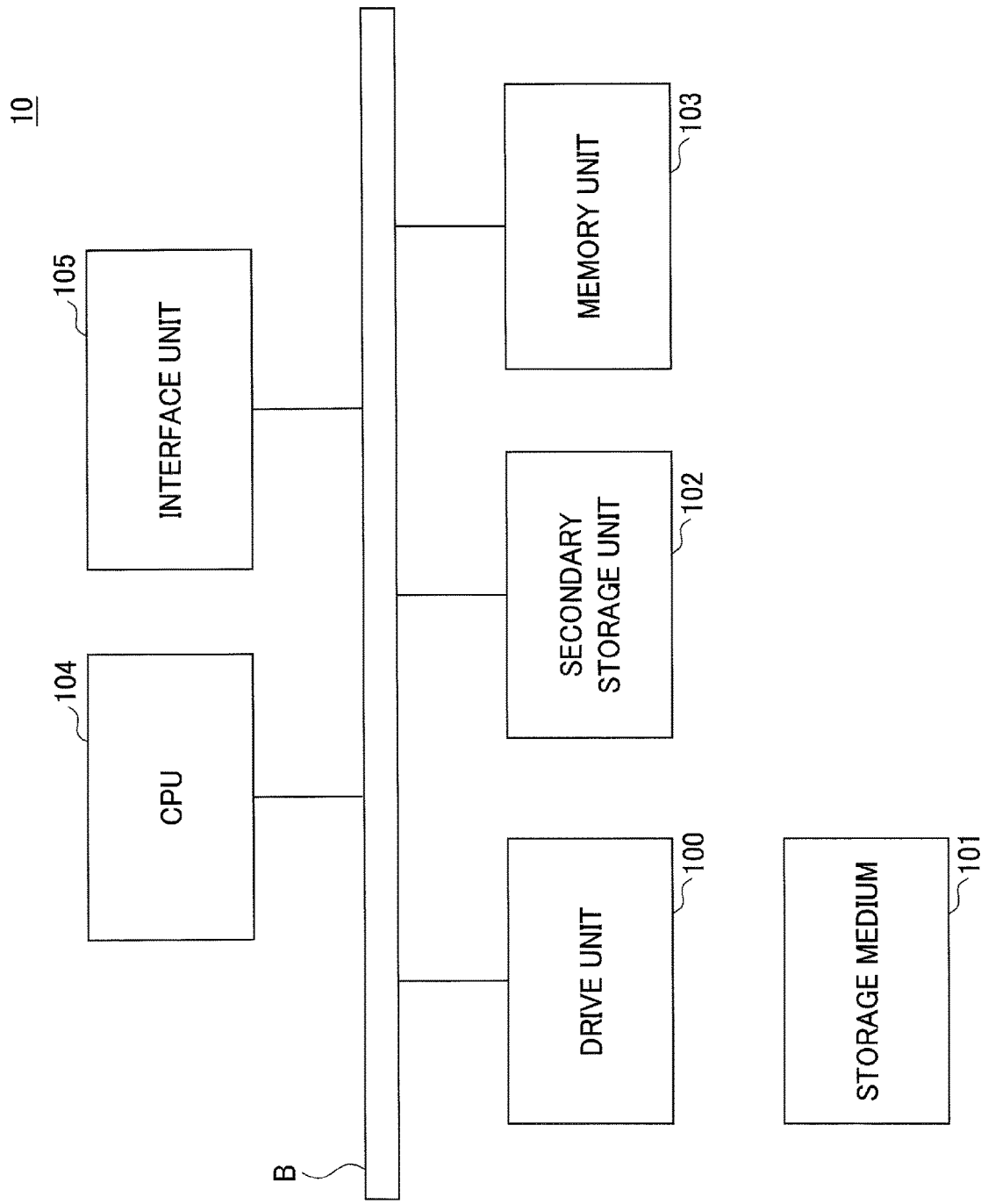
FIG. 2 is a schematic diagram showing an exemplary hardware structure of an anomaly detection device 10 according to a first embodiment.

FIG. 2 is a schematic diagram showing an exemplary hardware structure of an anomaly detection device according to a first embodiment. The anomaly detection device 10 of FIG. 2 includes a drive unit 100, a secondary storage unit 102, a memory unit 103, a CPU 104, and an interface unit 105, each interconnected by a bus B.

A program that achieves processing of the anomaly detection device 10 is provided by a storage medium 101, such as a CD-ROM. When the storage medium 101 storing the program is set in the drive unit 100, the program is installed in the secondary storage unit 102 from the storage medium 101 through the drive unit 100. However, it is not necessary to install the program from the storage medium 101, and the program may be downloaded from another computer via the network. The secondary storage unit 102 may store the installed program and further store the necessary files, data, and the like.

The memory unit 103 reads out the program from the secondary storage unit 102 and stores the program when an instruction to run the program is received. The CPU 104 performs functions pertaining to the anomaly detection device 10 according to the program stored in the memory unit 103. The interface unit 105 is used as an interface for connecting to a network.

Figure 3:
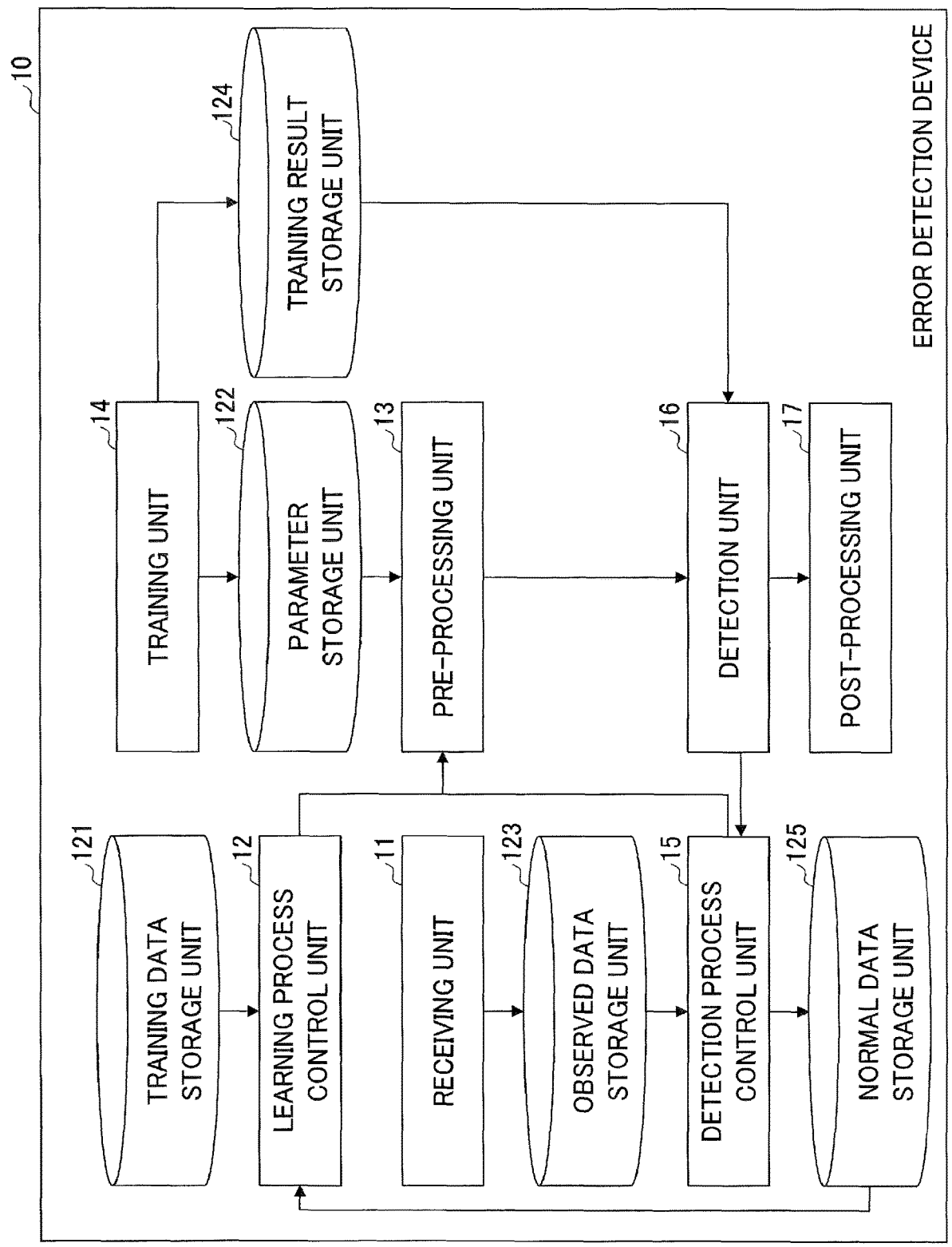
FIG. 3 is a schematic diagram showing an exemplary functional structure of the anomaly detection device 10 according to the first embodiment.

FIG. 3 is a schematic diagram showing an exemplary functional structure of the anomaly detection device 10 according to the first embodiment. In FIG. 3, the anomaly detection device 10 may include a receiving unit 11, a training process control unit 12, a pre-processing unit 13, a training unit 14, a detection process control unit 15, a detection unit 16, and a post-processing unit 17. Each of these units is realized by a process in which one or more programs installed in the anomaly detection device 10 are executed by the CPU 104. The anomaly detection device 10 also utilizes a training data storage unit 121, a parameter storage unit 122, an observed data storage unit 123, a training result storage unit 124, and a normal data storage unit 125. Each of these storage units can be realized, for example, by using a secondary storage unit 102 or a storage unit that can be connected to an anomaly detection device 10 via a network.

In the training data storage unit 121, the observed data that is ensured to have been collected under the normal condition is stored as training data. However, training data may be artificially generated rather than selected from observational data.

The receiving unit 11 receives observed data from the measuring device 20. The received observed data is stored in the observed data storage unit 123.

The training process control unit 12 controls the training process.

The pre-processing unit 13 executes pre-processing for the set of training data, the set of observed data, or the set of normal data stored in the normal data storage unit 125. The pre-processing may refer to processing such as the extraction of feature values per unit time from the data set and the normalization of extracted feature values. The feature values may be expressed in the form of numerical vectors. At the first training, a group of training data stored in the training data storage unit 121 is subject to pre-processing. When the reception of the observed data is started by the receiving unit 11, the observed data group is subject to the pre-processing. Further, when anomaly detection by the detection unit 16 is started and a determination is made that the condition is normal, and the number of observed data stored in the normal data storage unit 125 as the normal data reaches a predetermined number, the normal data is subjected to the pre-processing as a group.

The pre-processing unit 13 also may generate or update parameters (hereinafter referred to as "normalization parameters") for normalizing the observed data or the normal data when performing the pre-processing for the training data group or the normal data group, and may store the generated or updated normalization parameters in the parameter storage unit 122.

The training unit 14 performs training based on training data or normal data. The training result of the training unit 14 is stored in the training result storage unit 124.

The detection process control unit 15 controls detection processes.

The detection unit 16 detects the occurrence of an anomaly based on a numerical vector generated by pre-processing the observed data stored in the observed data storage unit 123 and a training result stored in the training result storage unit 124. Specifically, the detection unit 16 may compute a difference between the preprocessed numerical vector and the training result as an anomaly degree, and may detect the occurrence of an anomaly by comparing the anomaly degree to a threshold value. The value before normalization of the numerical vector in which no anomaly has been detected is stored in the normal data storage unit 125 as normal data.

The post-processing unit 17 estimates the metric that is the cause of the anomaly based on the anomaly degree of each metric of the numerical vector when the anomaly is detected.

Figure 4:
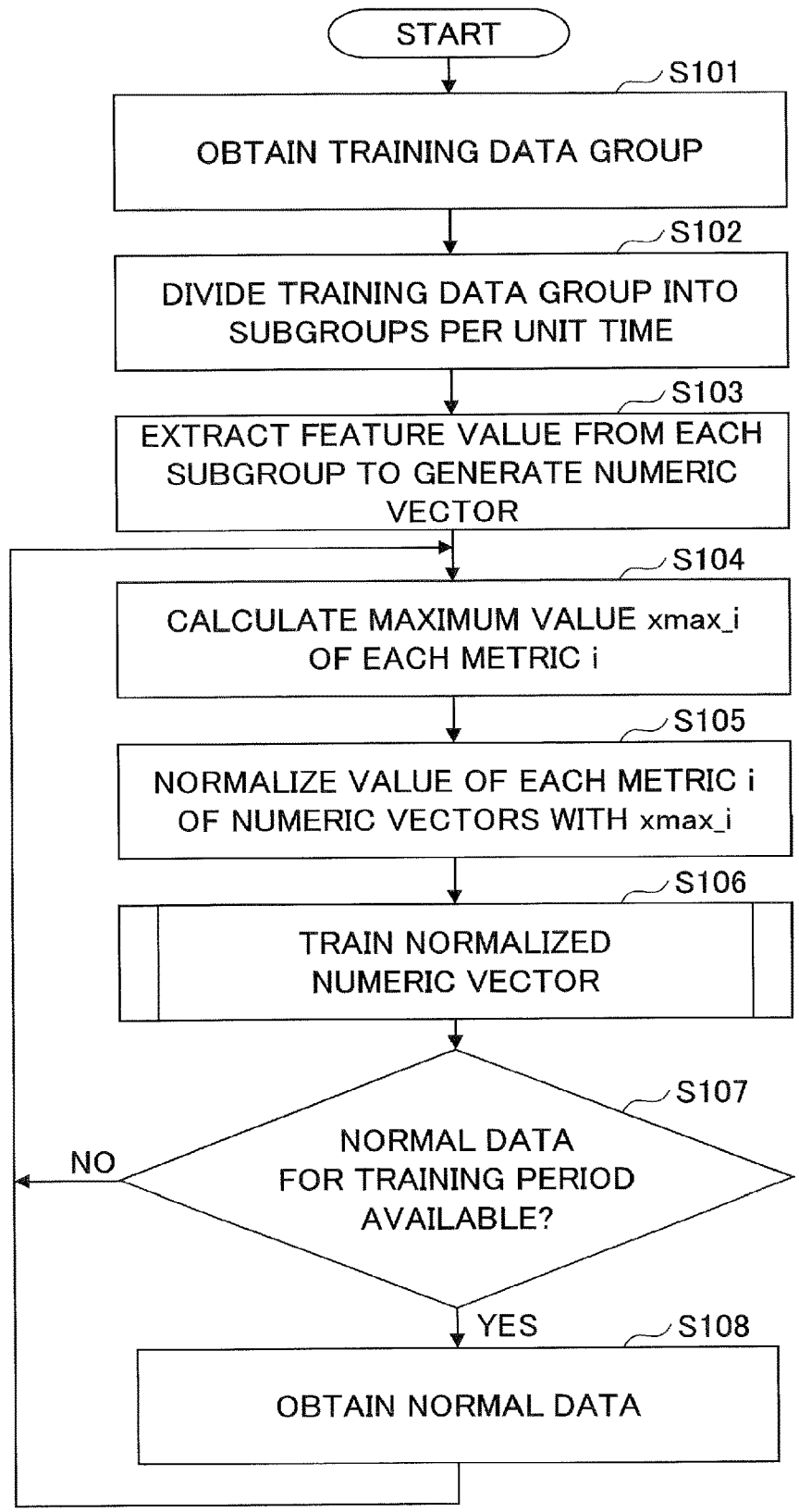
FIG. 4 is a flow chart showing an exemplary procedure of training procedure according to the first embodiment.

Hereinafter, the processing procedure performed by the anomaly detection device 10 will be described. FIG. 4 is a flow chart for explaining an exemplary procedure of training according to the first embodiment. For the sake of convenience, the following shows an example in which the flow data is to be processed.

When the training process is started, the training process control unit 12 acquires the training data group from the training data storage unit 121 and inputs the training data group to the pre-processing unit 13 (S101).

Subsequently, the pre-processing unit 13 divides the input training data group into a set per a unit of time (S102). In addition, in the training data storage unit 121, training data for the period of unit time×U (hereinafter referred to as the "training period") may be stored. Thus, the training data group may be divided into U sets.

Subsequently, in each divided set, the pre-processing unit 13 extracts a feature value according to a certain purpose, and generates a multidimensional numerical vector in which the extracted feature quantity is a component of each dimension (S103).

For example, assume that the unit time is one minute, and the pre-processing unit 13 extracts the feature value every one minute. Further assume that the feature value is the total number of transmitted bytes of each protocol (TCP, UDP). In this case, assuming that the flow start time of the first training data is 12:00:00, the pre-processing unit 13 computes the total number of transmission bytes of the all flows with the protocol of TCP, the total number of transmission bytes of the all flows with the protocol of UDP, and the like for a set of training data (flow data) of which the flow start time t falls within 11:59:00<=t<=12:00:00 among all training data, and generates a two-dimensional numerical vector in which the feature values are the elements of each dimension. Similarly, numerical vectors are generated for the other (U−1) sets.

It should be noted that the attribute of the feature value may be specified as a combination of "TCP" and "sending port number 80", for example. In addition, if each flow is considered to have a "flow number: 1", for example, the total number of all flows with respective attributes can be calculated in the same way and considered as a feature value.

Subsequently, the pre-processing unit 13 computes the maximum value xmax_i of each metric i (each dimension i) in each numerical vector and stores the computed xmax_i in the parameter storage unit 122 (S104). That is, in the first embodiment, the maximum value xmax_i of each metric i may be a normalization parameter.

Let's assume U=3. In addition, assume that the numerical vectors generated in step S103 are {{80, 20}, {90, 35}, {100, 50}}, for example. This indicates that the total number of transmission bytes with TCP and the total number of transmission bytes with UDP in a certain 3-minute period were "TCP: 80 bytes, UDP: 20 bytes," "TCP: 90 bytes, UDP: 35 bytes," and "TCP: 100 bytes, UDP: 50 bytes," respectively. In this case, the maximum value xmax_i of each metric of these numerical vectors is {100, 50} (i.e., xmax_1=100, xmax_2=50).

Subsequently, the pre-processing unit 13 normalizes each numerical vector based on the normalization parameter (S105). Normalization is achieved by dividing the value of metric i of each numerical vector by the maximum value xmax_i. Thus, the normalized numerical vectors are {0.8, 0.4}, {0.9, 0.7}, {1, 1}.

Subsequently, the training unit 14 trains about the numerical vector using a learner (S106). The training result is stored in the training result storage unit 124.

Subsequently, the training process control unit 12 waits for the normal data of the training period to be stored (saved) in the normal data storage unit 125 (S107). That is, the training process control unit 12 keeps waiting until U un-normalized numerical vectors are stored in the normal data storage unit 125. In the normal data storage unit 125, a numerical vector that is determined to be normal (no anomaly occurs) by the detection unit 16 is stored.

When the numerical vectors for the training period are stored in the normal data storage unit 125 (Yes in S107), the training process control unit 12 acquires the numerical vector group from the normal data storage unit 125 and inputs the numerical vector group to the pre-processing unit 13 (S108). The acquired numerical vector group is deleted from the normal data storage unit 125. Subsequently, for the numerical vector group, Step S104 and following steps may be performed. Accordingly, the next step S105 performs normalization based on the newly calculated xmax_i.

Figure 5:
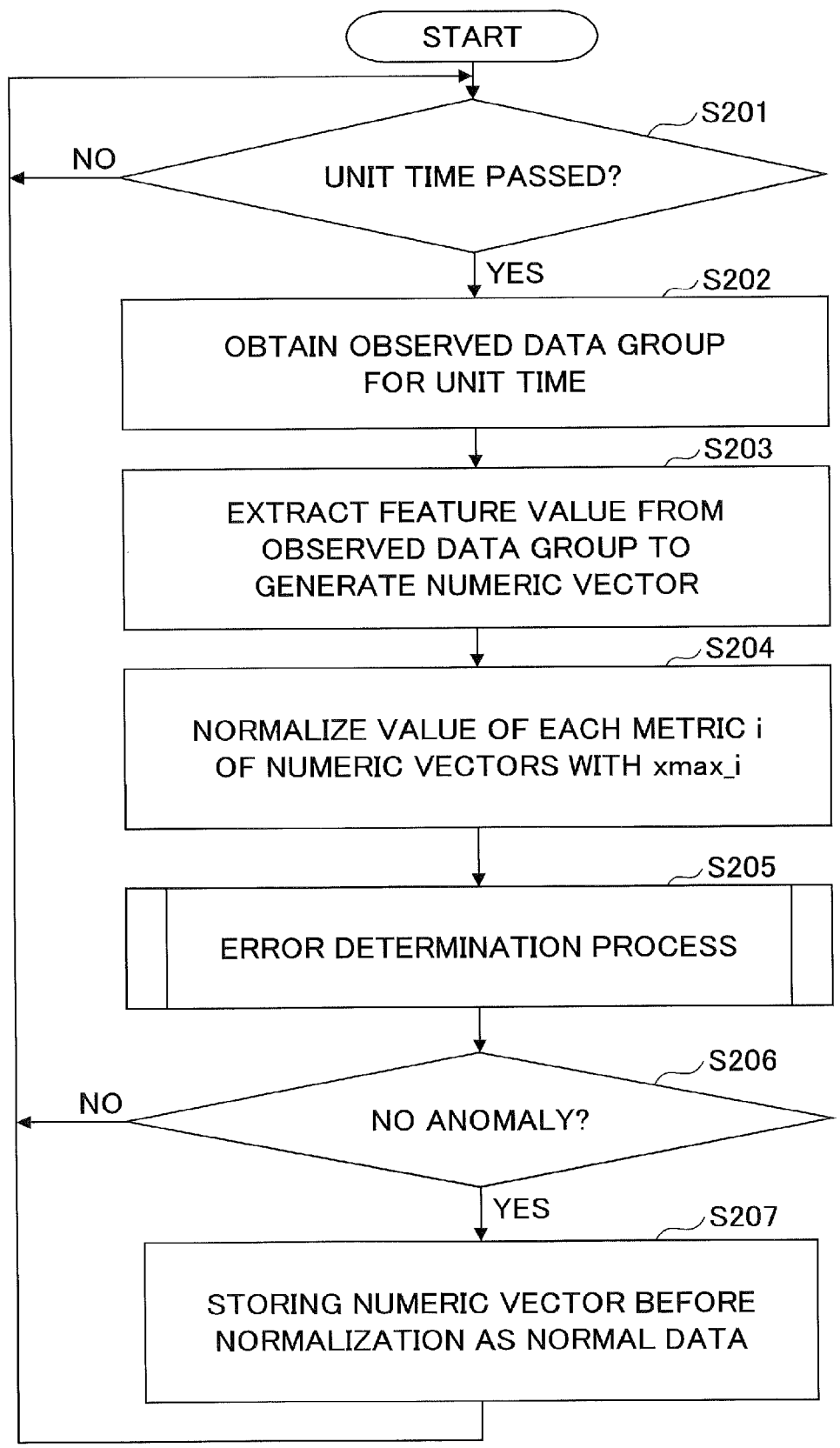
FIG. 5 is a flow chart showing an exemplary procedure of detection procedure according to the first embodiment.

FIG. 5 is a flow chart for explaining an exemplary procedure of detection according to the first embodiment. The processing procedure of FIG. 5 may be initiated at any time after step S106 of FIG. 4 has been performed at least one time. That is, the processing procedure of FIG. 5 may be performed in parallel with the processing procedure of FIG. 4.

In step S201, the detection process control unit 15 waits for a unit time to elapse. The unit time to wait for is the same as the unit time discussed with respect to FIG. 4. While waiting, the observed data collected in real time and received by the receiving unit 11 is stored in the observation data storage unit 123.

After waiting for the unit time (Yes in S201), the detection process control unit 15 retrieves the observed data group for the latest unit time from the observed data storage unit 123 and inputs the observed data group into the pre-processing unit 13 (S202).

Subsequently, the pre-processing unit 13 extracts a feature value from the observed data group according to a certain purpose, and generates a multidimensional numerical vector in which the extracted feature quantity is a component of each dimension (S203) For example, the total number of transmission bytes of all flows with the protocol of TCP and the total number of transmission bytes of all flows with the protocol of UDP are extracted to generate a two-dimensional numerical vector with these values as elements of each dimension. Here, one numerical vector is generated.

Subsequently, the pre-processing unit 13 normalizes the generated numerical vector based on the maximum value xmax_i stored in the parameter storage unit 122 (S204). That is, each metric i of the numerical vector is divided by the maximum value xmax_i.

For example, if step S104 of FIG. 4 is performed only once based on the above training data, the maximum value xmax_i is {100, 50}. Therefore, if the numerical vector is {60, 40}, the numerical vector is normalized to {0.6, 0.8}.

Subsequently, the detection unit 16 performs an anomaly determination process (S205). In the anomaly determination process, the presence or absence of an anomaly is determined for the network N1 based on the normalized numerical vector and the latest training result stored in the training result storage unit 124.

When it is determined that there is no anomaly (Yes in S206), the detection process control unit 15 stores the numerical vector before normalization thereof in the normal data storage unit 125 as normal data (S207). When it is determined that there is an anomaly (No in S206), the numerical vector before normalization thereof is not stored in the normal data storage unit 125. Accordingly, only a numerical vector at a normal condition is stored in the normal data storage unit 125.

Subsequently, steps S201 or later are repeated. In the process in which steps S201 and later are repeated, the normalization parameters utilized in step S204 may be updated from time to time in step S104 of FIG. 4, which is performed in parallel. As a result, the numerical vector can be normalized taking into account the trend of the observed data being input.

For example, it is assumed that U=3 and that step S207 has been performed three times and {{60, 40}, {45, 20}, {30, 30}} is stored in the normal data storage unit 125. In this case, xmax_1 and xmax 2 are updated to 60 and 40, respectively, and the update result is reflected in the parameter storage unit 122.

Although an example in which the observed data is the flow data is described above, the flow data, MIB data, and CPU utilization rate may be received in parallel as the observed data. In this case, each step of the processing procedure of FIGS. 4 and 5 may be performed by data type (by the flow data, the MIB data, and the CPU usage rate).

For MIB data given in a format such as {hostID, interface ID, ibps, obps}, for example, numerical vectors can be extracted such as: "ibps of host IDa in unit time," "obps of host IDa in unit time," "ibps of host IDb in unit time," "obps of host IDb in unit time," . . . "ibps of interface IDx in unit time," "obps of interface IDx in unit time," "ibps of interface IDy in unit time," and "obps of interface IDy in unit time," for example.

Next, an example of step S106 of FIG. 4 and step S205 of FIG. 5 will be described. In steps S106 and S205, numerical vector groups with data types assigned as labels are input to the training unit 14 or the detection unit 16. In the present embodiment, the label may be either "flow data," "MIB data," or "CPU utilization." The label may be assigned to the training data and the observed data, for example, by the measuring device 20 or the receiving unit 11. That is, the label to be assigned to the observed data can be identified on the basis of the source of the observed data. The label is passed on to a numerical vector to be generated by the pre-processing unit 13.

In step S106 of FIG. 4, the training unit 14 generates a trainer for each data type. The training unit 14 classifies the numerical vectors based on the label assigned to the input numerical vector and inputs the numerical vectors into respective learners corresponding to the classification result. In the present embodiment, a "flow data learner," "MIB data learner," and "CPU usage rate learner" are generated. An auto-encoder (see Non Patent Document 2) that detects anomalies by training the correlation between the metrics of the numerical vector, and principal component analysis may be used as a learner. For principal component analysis, details may be found, for example, in "Ringberg, Haakon, et al. "Sensitivity of PCA for traffic anomaly detection," see ACM SIGMETRICS Performance Evaluation Review 35.1 (2007): 109-120". In the present embodiment, an example of using an auto-encoder as a learner will be described.

Figure 6:
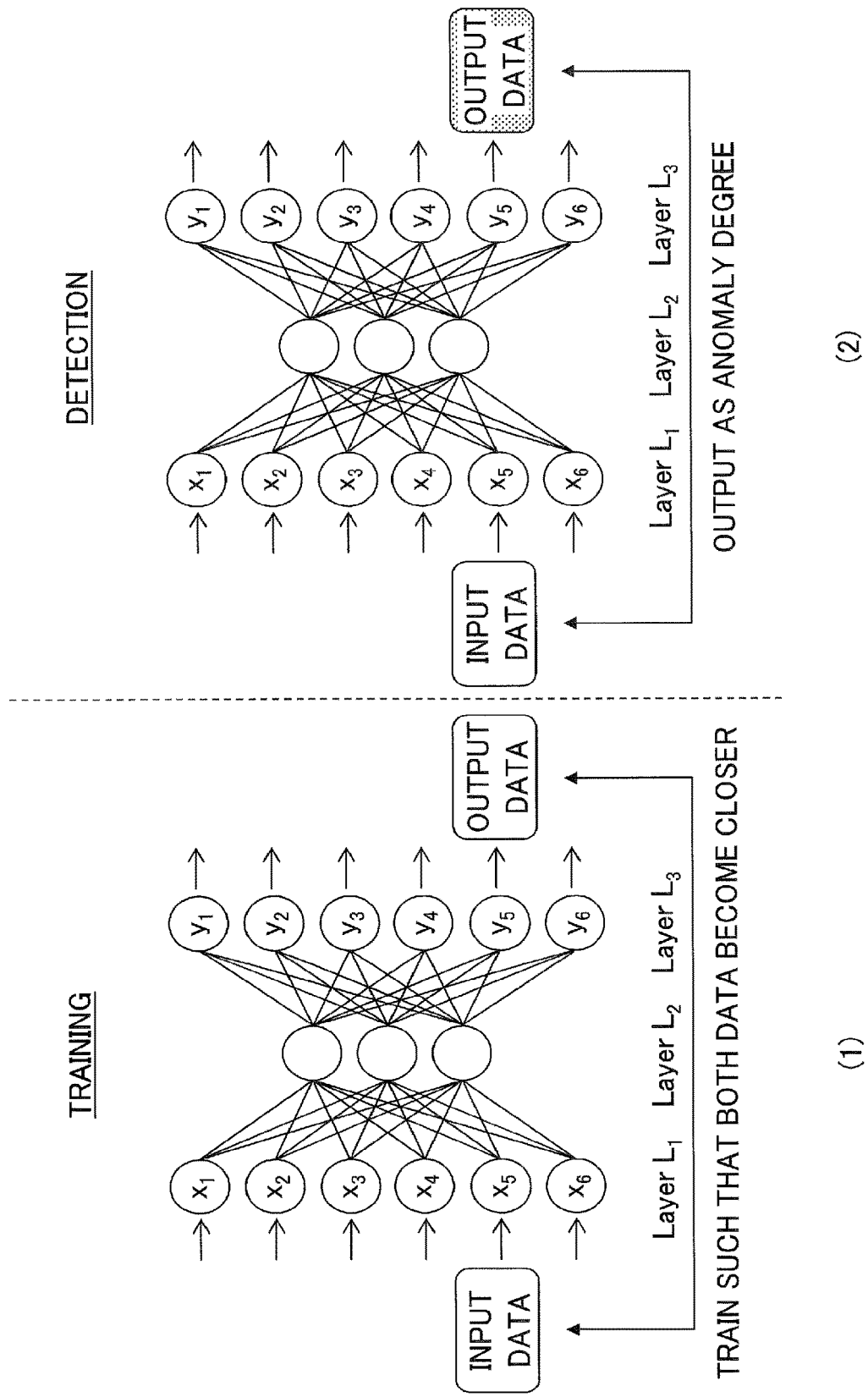
FIG. 6 is a schematic drawing for explaining an auto-encoder.

FIG. 6 is a schematic drawing for explaining an auto-encoder. The auto-encoder is an anomaly detection algorithm based on deep planning. The auto-encoder utilizes the fact that the input data of metrics under normal condition is correlated to each other and can be compressed with a few dimensions. In the presence of an anomaly, the correlation between the input data may be disrupted, so that compression may not be performed correctly and the difference between the input data and the output data may be large.

As shown in (1) of FIG. 6, the learner (auto-encoder) generated by the training unit 14 trains so that the output layer (Layer L3) gets closer to the input layer (Layer L1). Specifically, the training unit 14 replicates a numerical vector into two, applies one of the numerical vectors to the input layer, applies the other to the output layer for training and outputs the training results. The training result is stored in the training result storage unit 124. The training results are a group of parameters for the learner. Since a learner is generated for each data type, the training result is also output for each data type and stored in the training result storage unit 124.

Meanwhile, the detection unit 16, like the training unit 14, generates a learner for each data type. The learner may use a method corresponding to a learner generated by the training unit 14, such as an auto-encoder or principal component analysis, in the same manner as a learner generated by the training unit 14.

In step S205 of FIG. 5, the detection unit 16 may generate a "learner of flow data", "learner of MIB data", and "learner of CPU usage rate" based on the training result stored in the training result storage unit 124. That is, the learner generated by the detection unit 16 is the same as the learner generated by the training unit 14 at the time of output of the training result. As shown in (2) of FIG. 6, the detection unit 16 inputs a numerical vector for each data type input in Step S205 to a learner corresponding to the data type of the numerical vector, and calculates the distance between the input data and the output data (an index indicating the degree of disruption of the correlation between the metrics) for the learner as an anomaly degree. In the present embodiment, the mean squared error (MSE: Mean Squared Error), which is the distance between the input layer and the output layer of the auto-encoder, is calculated as an anomaly degree. The equation for MSE is as follows.

$$MSE = \frac{1}{n}\sum_{i=1}^{n}(\hat{x}_i - x_i)^2 \qquad \text{[Equation 1]}$$

In the present embodiment, MSE of flow data, MSE of MIB data, and MSE of CPU usage may be obtained. The detection unit 16 calculates the average of the obtained MSE as the final degree of anomaly and determines the presence of an anomaly when the final degree of anomaly exceeds a predetermined threshold. Otherwise, the detection unit 16 determines the normal condition. The detection unit 16 inputs a numerical vector, for example, when it determines the presence of an anomaly, to the post-processing unit 17.

Subsequently, the processing procedure which is performed by the post-processing unit 17 when a numerical vector is input from the detection unit 16 will be described.

Figure 7:
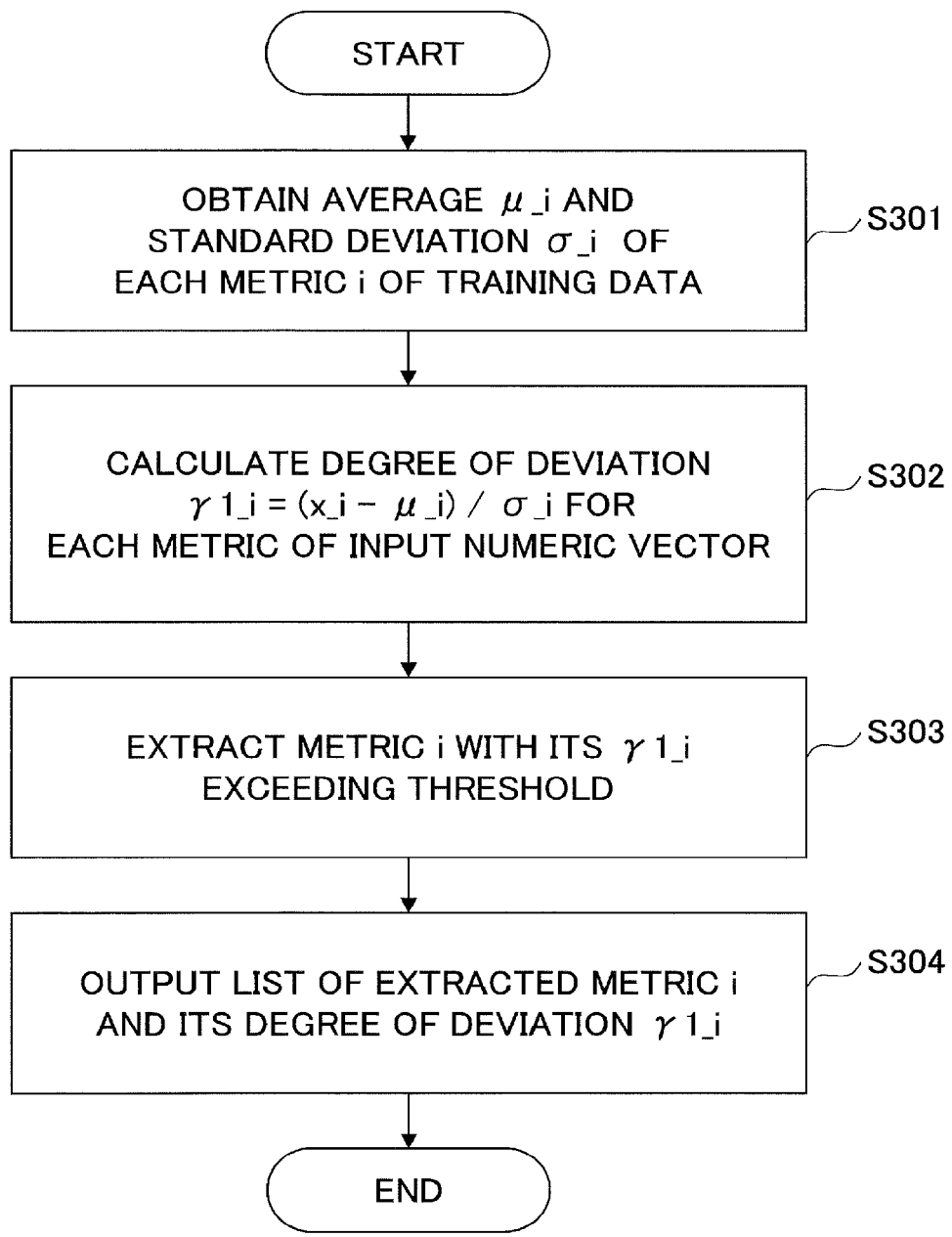
FIG. 7 is a flow chart showing an exemplary procedure performed by a post-processing unit 17 according to the first embodiment.

FIG. 7 is a flow chart showing an exemplary procedure performed by a post-processing unit 17 according to the first embodiment. In the first embodiment, it is assumed that the distribution information (average $\mu\_i$ and standard deviation $\sigma\_i$) for each metric i is calculated for the numerical vector group before normalization based on the training data group stored in the training data storage unit 121, and is stored in the training data storage unit 121.

In step S301, the post-processing unit 17 retrieves the mean $\mu\_i$ and the standard deviation $\sigma\_i$ for each metric i of the numerical vector group based on the training data group from the training data storage unit 121.

Subsequently, the post-processing unit 17 computes the degree of deviation $\gamma 1\_i$ from the distribution of the metric in the group of numerical vectors based on the training data for each metric i of a numerical vector input from the detection unit 16 (S302) $\gamma 1\_i$ may be calculated as follows:

$$\gamma 1\_i = (x\_i - \mu\_i)/\sigma\_i$$

Subsequently, the post-processing unit 17 extracts a metric i of which the absolute value of $\gamma 1\_i$ exceeds a predetermined threshold value (S303). Subsequently, the post-processing unit 17 may determine the extracted metric i as a candidate of the cause of the anomaly, and outputs the list of the ID (identifier) of the metric i and the degree of deviation γ1_i of the metric i as information for estimating the cause of the anomaly (S304). The order of output may be in descending order of the degree of deviation γ1_i.

The average μ_i and the standard deviation σ_i obtained in step S301 may be the average μ_i and the standard deviation σ_i of each metric i of the normal data group, if the normal data group for the training period is stored in the normal data storage unit 125.

As described above, according to the first embodiment, the degree of deviation from the distribution of the numerical vectors is calculated for each metric of the numerical vectors based on the observed data in which an anomaly is detected, and the metric with the degree of deviation exceeding the threshold may be output. As a result, a user may estimate that the output metric is the cause of the anomaly. Accordingly, it is possible to assist in the estimation of the cause of an anomaly detected in a target object for detecting an anomaly.

Next, a second embodiment will be described. In the second embodiment, the differences from the first embodiment will be described. The second embodiment may be the same as the first embodiment unless otherwise specified. In the second embodiment, the processing procedure of FIG. 7 may be replaced by the processing procedure of FIG. 8.

Figure 8:
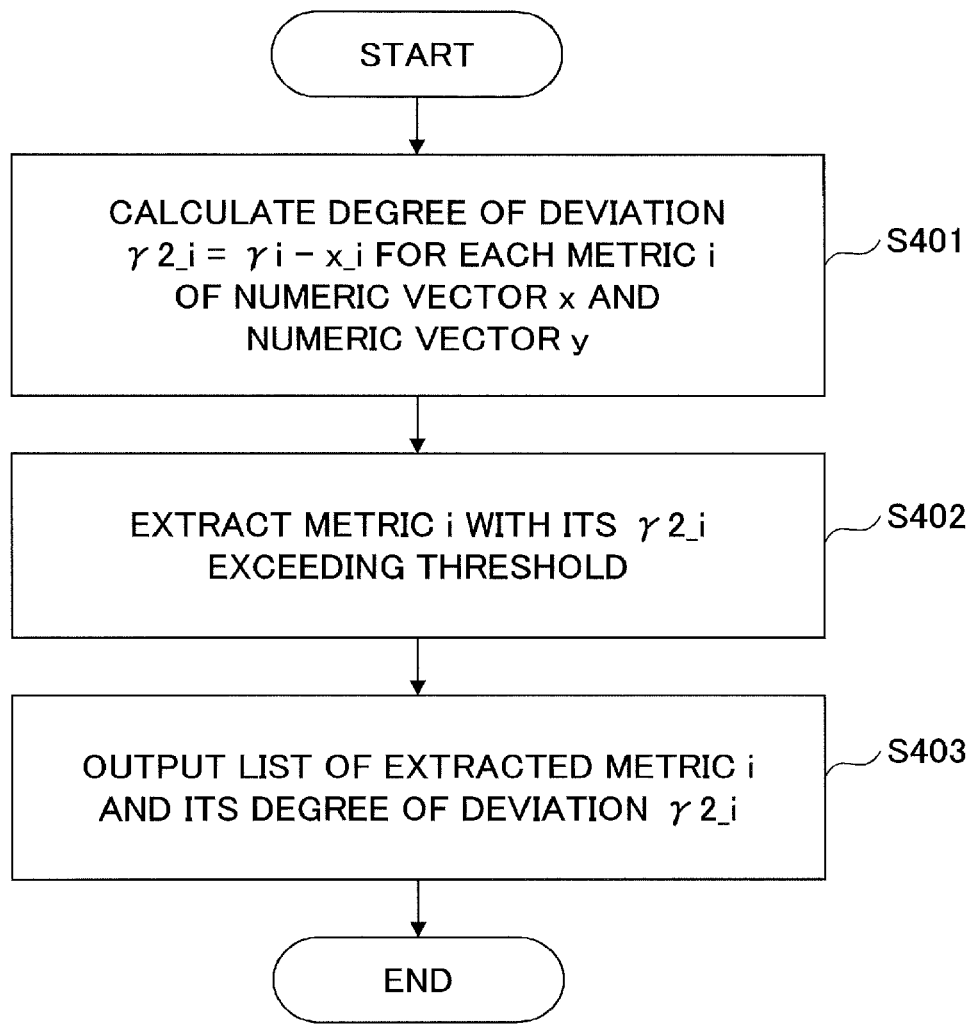
FIG. 8 is a flow chart showing an exemplary procedure performed by a post-processing unit 17 according to a second embodiment.

FIG. 8 is a flow chart showing an exemplary procedure performed by a post-processing unit 17 according to the second embodiment. In the second embodiment, a numerical vector x (a numerical vector of the input layer of FIG. 6(2)) that has been input to the learner when an anomaly was detected by the detection unit 16 and a numerical vector γ (a numerical vector of the output layer of FIG. 6(2)) output from the training unit are input from the detection unit 16 to the post-processing unit 17.

In step S401, the post-processing unit 17 computes the degree of deviation γ2_i for each metric i for the numerical vector x=(x_1, x_2, . . . , x_N) and the numerical vector y=(y_1, y_2, . . . , y_N). In the second embodiment, the degree of deviation γ2_i is the distance (difference) between x_i and y_i.

$$γ2\_i = y\_i - x\_i$$

Subsequently, the post-processing unit 17 extracts a metric i of which the absolute value of γ2_i exceeds a predetermined threshold value (S403). Subsequently, the post-processing unit 17 outputs the list of the ID (identifier) of the metric i and the degree of deviation γ2_i of the metric i as information for estimating the cause of the anomaly using the extracted metric i as the cause of the anomaly (S404). The order of output may be in descending order of the degree of deviation γ2_i.

As described above, according to the second embodiment, it is possible to assist in estimating the cause of an anomaly when the anomaly is detected with respect to the target object in a similar manner as the first embodiment.

Next, a third embodiment will be described. In the third embodiment, the differences from the first embodiment will be described. The third embodiment may be the same as the first embodiment unless otherwise specified. In the third embodiment, the processing procedure of FIG. 7 may be replaced by the processing procedure of FIG. 9.

In step S501, the post-processing unit 17 searches for a numerical vector with minimum anomaly degree in input numerical vectors (hereinafter referred to as "input vector") from the detection unit 16 at the learner (function) in which the detection unit 16 detected an anomaly. By searching for a numerical vector that minimizes the degree of anomaly with the internal parameters (training results) of the learner (function) fixed, the dimension that caused the anomaly can be corrected. It should be noted that such searching may be performed by known methods such as steepest descent method.

Subsequently, the post-processing unit 17 computes the difference γ3_i for each metric i for the input vector and the searched numerical vector (the searched vector).

Subsequently, the post-processing unit 17 extracts a metric i of which the absolute value of γ3_i exceeds a predetermined threshold value (S503). Subsequently, the post-processing unit 17 outputs the list of the ID (identifier) of the metric i and the difference γ3_i of the metric i as information for estimating the cause of the anomaly using the extracted metric i as the cause of the anomaly (S504). The order of output may be in the descending order of the difference γ3_i.

As described above, according to the third embodiment, it is possible to assist in estimating the cause of an anomaly when the anomaly is detected with respect to the target object in a similar manner as the first or second embodiment.

Figure 10:
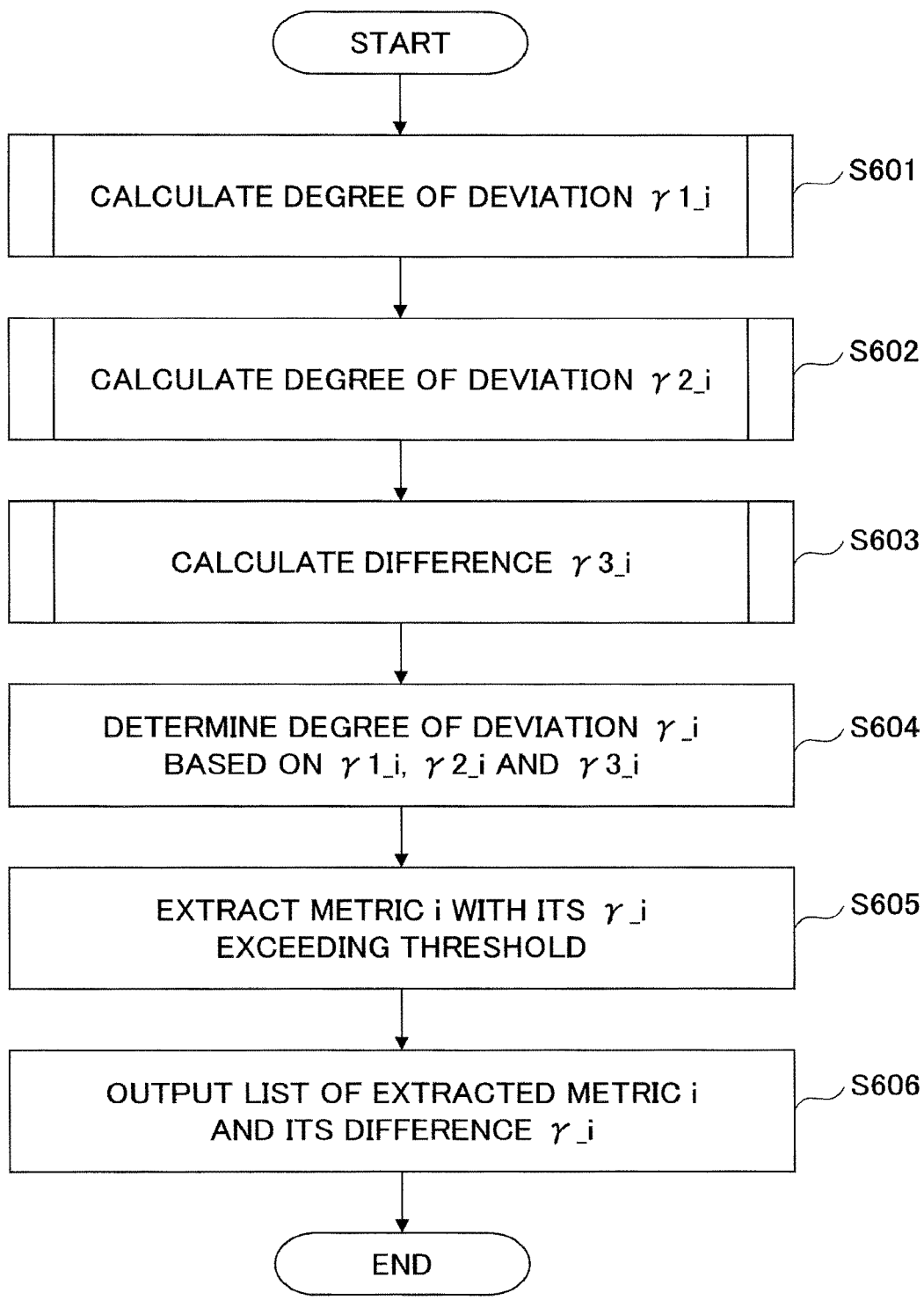
FIG. 10 is a flow chart showing an exemplary procedure performed by a post-processing unit 17 according to a fourth embodiment.

Next, a fourth embodiment will be described. In the fourth embodiment, the differences from the first embodiment will be described. The fourth embodiment may be the same as the first embodiment unless otherwise specified. The fourth embodiment is a combination of the first, second, and third embodiments. In the fourth embodiment, the processing procedure of FIG. 7 may be replaced by the processing procedure of FIG. 10.

In step S601, the post-processing unit 17 performs steps S301 and S302 of FIG. 7 to calculate the degree of deviation γ1_i for each metric of the input numerical vector.

Subsequently, the post-processing unit 17 performs step S401 of FIG. 8 to calculate the degree of deviation γ2_i for each metric of the input numerical vector (S602).

Figure 9:
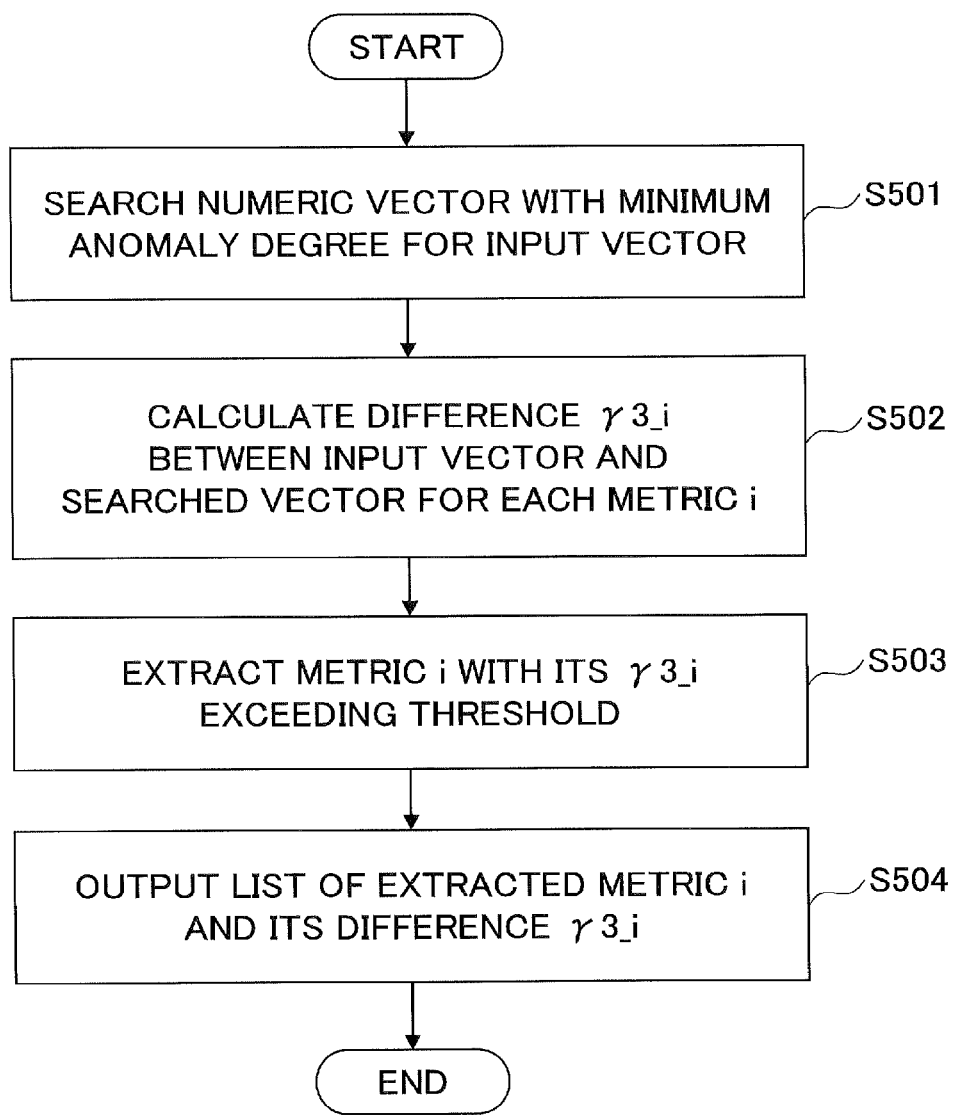
FIG. 9 is a flow chart showing an exemplary procedure performed by a post-processing unit 17 according to a third embodiment.

Subsequently, the post-processing unit 17 performs steps S501 and S502 of FIG. 9 to calculate the difference γ3_i for each metric of the input numerical vector (S603).

Subsequently, the post-processing unit 17 combines γ1_i, γ2_i, and γ3_i to determine the integrated degree of deviation γ_i of the metric i (S604). A simple average (γ1_i= (γ1_i+γ2_i+γ3_i)/3), a weighted average, a maximum value may be selected as the combination, or a median may be selected, or other methods may be employed.

Subsequently, the post-processing unit 17 extracts a metric i of which the absolute value of γ_i exceeds a predetermined threshold value (S605). Subsequently, the post-processing unit 17 outputs the list of the ID (identifier) of the metric i and the difference γ_i of the metric i as information for estimating the cause of the anomaly using the extracted metric i as the cause of the anomaly (S606). The order of output may be in the descending order of the difference γ_i.

Any one of steps S601, S602, and S603 may be omitted.

As described above, according to the fourth embodiment, it is possible to assist in estimating the cause of an anomaly when the anomaly is detected with respect to the target object in a similar manner as the first, second, or third embodiment.

The embodiments described above may be applied to data collected from other than a network. For example, each of the above embodiments may be applied to data collected from a computer system.

In each of the above-described embodiments, the anomaly detection device 10 is an example of an anomaly factor estimation unit. The post-processing unit 17 is an example of a first computing unit, a second computing unit, a third computing unit, and a fourth computing unit.

While the embodiments of the present invention have been described in detail, the present invention is not limited to such specific embodiments, and various modifications and changes may be made within the scope of the spirit of the invention as set forth in the appended claims.

This application claims priority under Japanese Patent Application No. 2017-017922 filed on Feb. 2, 2017, which is hereby incorporated by reference in its entirety.

EXPLANATIONS OF LETTERS OR NUMERALS

10 Anomaly detection device
11 Receiving unit
12 Training process control unit
13 Pre-processing unit
14 Training unit
15 Detection process control unit
16 Detection unit
17 Post-processing unit
20 Measuring devices
100 Drive unit
101 Storage media
102 Secondary storage unit
103 Memory unit
104 CPU
105 Interface unit
121 Training data storage unit
122 Parameter storage unit
123 Observed data storage unit
124 Training result storage unit
125 Normal data storage unit
B Bus
N1 Network

The invention claimed is:

1. A device for estimating a cause of an anomaly, comprising:
processing circuitry configured to
detect an anomaly in a detection target, the detection target being a system including a plurality of measuring devices, based on a learner trained, based on a deep-learning-based anomaly detection algorithm, on first numerical vectors obtained from the detection target via the measuring devices when the detection target is under a normal condition and second numerical vectors to be obtained from the detection target via the measuring devices at multiple times;
compute, based on a metric, which is a type of measurement or a parameter that is measured, of a second numerical vector of the second numerical vectors from which an anomaly has been detected, information for estimating a metric of cause of the anomaly, the second numerical vectors each being made from a plurality of different metrics,
wherein
the processing circuitry is further configured to perform (i) searching, for a second numerical vector of the second numerical vectors in which an anomaly has been detected, (ii) searching for a third numerical vector in which no anomaly has been detected by the detection unit and (iii) computing, as information for estimating a respective metric, from among the plurality of different metrics, which causes the anomaly, based on a difference in values of the respective metric, between the second numerical vector and the third numerical vector, exceeding a predetermined threshold.

2. A computer implemented method of estimating a cause of an anomaly, the method comprising:
detecting an anomaly in a detection target, the detection target being a system including a plurality of measuring devices, based on a learner trained, based on a deep-learning-based anomaly detection algorithm, on first numerical vectors obtained from the detection target via the measuring devices when the detection target is under a normal condition and second numerical vectors to be obtained from the detection target via the measuring devices at multiple times; and
computing, based on a metric, which is a type of measurement or a parameter that is measured, of a second numerical vector of the second numeric vectors from which an anomaly has been detected, information for estimating a metric of cause of the anomaly, the second numerical vectors each being made from a plurality of different metrics,
wherein
the computing comprises performing ((i) searching, for a second numerical vector of the second numerical vectors in which an anomaly has been detected, (ii) searching for a third numerical vector in which no anomaly has been detected by the detection unit and (iii) computing, as information for estimating a respective metric, from among the plurality of different metrics, which causes the anomaly, based on a difference in values of the respective metric, between the second numerical vector and the third numerical vector, exceeding a predetermined threshold.

3. A non-transitory computer readable storage medium storing instructions, which when executed by a computer, causes the computer to implement a method of estimating a cause of an anomaly, the method comprising:
detecting an anomaly in a detection target, the detection target being a system including a plurality of measuring devices, based on a learner trained, based on a deep-learning-based anomaly detection algorithm, on first numerical vectors obtained from the detection target via the measuring devices when the detection target is under a normal condition and second numerical vectors to be obtained from the detection target via the measuring devices at multiple times; and
computing, based on a metric, which is a type of measurement or a parameter that is measured, of a second numerical vector of the second numeric vectors from which an anomaly has been detected, information for estimating a metric of cause of the anomaly, the second numerical vectors each being made from a plurality of different metrics,
wherein
the computing comprises performing ((i) searching, for a second numerical vector of the second numerical vectors in which an anomaly has been detected, (ii) searching for a third numerical vector in which no anomaly has been detected by the detection unit and (iii) computing, as information for estimating a respective metric, from among the plurality of different metrics, which causes the anomaly, based on a difference in values of the respective metric, between the second numerical vector and the third numerical vector, exceeding a predetermined threshold.

* * * * *